(12) United States Patent
Rosing

(10) Patent No.: US 7,246,181 B2
(45) Date of Patent: Jul. 17, 2007

(54) DEVICE AND METHOD FOR IDENTIFYING A COMMUNICATION INTERFACE THAT PERFORMS AN OPERATING PARAMETER CLOSER TO A DESIRED PERFORMANCE LEVEL THAN ANOTHER COMMUNICATION INTERFACE PERFORMS THE OPERATING PARAMETER

(75) Inventor: Tajana Simunic Rosing, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 209 days.

(21) Appl. No.: 10/941,583

(22) Filed: Sep. 14, 2004

(65) Prior Publication Data

US 2006/0059291 A1   Mar. 16, 2006

(51) Int. Cl.
*G06F 3/00* (2006.01)
*H04Q 7/20* (2006.01)

(52) U.S. Cl. .................. 710/18; 710/11; 455/452.2; 455/552.1

(58) Field of Classification Search ................ 710/113, 710/11, 18; 455/445, 552.1, 452.2
See application file for complete search history.

(56) References Cited

U.S. PATENT DOCUMENTS

| | | | | |
|---|---|---|---|---|
| 5,448,701 A | * | 9/1995 | Metz et al. ................ | 710/113 |
| 5,802,502 A | * | 9/1998 | Gell et al. ................. | 705/37 |
| 5,946,634 A | * | 8/1999 | Korpela ..................... | 455/552.1 |
| 6,671,258 B1 | * | 12/2003 | Bonneau .................... | 370/235 |
| 6,751,193 B1 | * | 6/2004 | Kudrimoti et al. ......... | 370/231 |
| 6,801,777 B2 | * | 10/2004 | Rusch ....................... | 455/452.2 |
| 7,031,718 B2 | * | 4/2006 | Jouppi et al. .............. | 455/450 |
| 7,058,387 B2 | * | 6/2006 | Kumar et al. .............. | 455/406 |
| 2003/0100308 A1 | * | 5/2003 | Rusch ....................... | 455/445 |

OTHER PUBLICATIONS

Johnson et al., "Protocols for Adaptive Wireless and Mobile Networking", IEEE Personal Communications, 3(1), Feb. 1996.
Simunic, et al., "Dynamic Voltage Scaling and Power Management for Portable Systems", DAC 2001, Jun. 18-22, 2001, 2001.
Maltz, et al., "MSOCKS: An Architecture for Transport Layer Mobility", IEEE INFOCOM'98.
Satyanarayanan, "Accessing information on demand at any location Mobile Information Access", IEEE Personal Communications, Feb. 1996, pp. 26-33.

(Continued)

*Primary Examiner*—Khanh Dang

(57) ABSTRACT

An electronic device includes multiple communication interfaces and a processor coupled to the interfaces. The processor is operable to identify an interface that can transfer data with a performance of a parameter that is closer to a desired performance level than the performance of the same parameter by another interface, and is operable to transfer the data via the identified interface. Such a device can, without operator input, select and transfer data via the communication interface that gives the best data-transfer performance relative to a particular parameter such as power consumption. Furthermore, if the performance of the selected communication interface changes during the data transfer, the device may, without operator input, identify an interface that offers better performance and switch over to transferring the data transfer via the identified interface. Moreover, the device may, without operator input, allow a number of software applications to share a lesser number of interfaces.

15 Claims, 9 Drawing Sheets

OTHER PUBLICATIONS

Zhao, et al., "Flexible Network Support for Mobile Hosts", ACM/Baltzer Journal of Special Topics in Mobile Networks and Applications (MONET), first quarter, 2001.

Kravets, et al., "A Cooperative Approach to User Mobility".

Tourrilhes, et al., "P-Handoff: A Protocol for fine grained peer-to-peer vertical handoff".

Tourrilhes, et al., "Co-Link configuration: Using wireless diversity for more than just connectivity".

Ye, et al., "An Energy-Efficient MAC Protocol for Wireless Sensor Networks", University of California.

Brewer, et al, "A Network Architecture for Heterogeneous Mobile Computing".

Snoeren, et al., "An End-to-End Approach to Host Mobility", 6th ACM/IEEE International Conference on MObile Computing and Networking (MobiCom'00).

Jones, et al., "A Survey of Energy Efficient Network Protocols for Wireless Networks", Kluwer Academic Publishers, 2001.

U.S. Appl. No. 10/891,338, Rosing et al.

U.S. Appl. No. 10/632,412, Acquaviva et al.

Rosing, et al., "Heterogeneous wireless network management", Proceedings of PACS'03, pp. 101-112, Dec. 2003.

Roussopoulos, et al., "Person-level Routing in the Mobile People Architecture".

Simunic, et al., "Event-Driven Power Management", IEEE Transactions on Computer Aided Design of Integrated Circuits and Systems, vol. 20, No. 7, Jul. 2001.

* cited by examiner

DEVICE AND METHOD FOR IDENTIFYING A COMMUNICATION INTERFACE THAT PERFORMS AN OPERATING PARAMETER CLOSER TO A DESIRED PERFORMANCE LEVEL THAN ANOTHER COMMUNICATION INTERFACE PERFORMS THE OPERATING PARAMETER

BACKGROUND

To extend the time during which one can operate a portable electronic device on battery power, engineers typically design the device to consume as little power as possible while operating on batteries. For example, engineers design laptop computers and personal digital assistants (PDAs) to enter a lower-power mode, such as a sleep or standby mode, after a predetermined period of operator inactivity. When the laptop or PDA detects user activity (e.g., the pressing of a button on a keyboard), it transitions from the lower-power mode back to the active mode.

Many of these portable electronic devices include one or more communication interfaces for transferring data to and from software applications running on the device. For example, a PDA may include one or more wireless communication interfaces such as a wireless peer-to-peer-area-network (WPAN) interface that operates according to the Bluetooth standard, a wireless local-area-network (WLAN) interface that operates according to the IEEE 802.11 standard, or a wireless wide-area-network (WAN) interface that operates according to the GPRS standard.

Unfortunately, a portable electronic device having multiple communication interfaces may not always transfer data via the interface that consumes the least power Another problem with such a portable electronic device is that if the interface transferring the data becomes unavailable (e.g., loses signal), then the operator of the device typically must wait until the interface becomes available or must manually select another interface that is available to continue the data transfer.

Yet another problem with such a portable electronic device is that it may have multiple communication interfaces turned on simultaneously while the device could consume significantly less power by using fewer interfaces, or a single interface, to transfer the data.

SUMMARY

One embodiment of the invention is an electronic device that includes multiple communication interfaces and a processor coupled to the interfaces. The processor is operable to identify an interface that can transfer data with a performance of an operating parameter that is closer to a desired performance level than the performance of the parameter by another interface, and is operable to transfer the data via the identified interface.

Such a device can, without operator input, select and transfer data via the communication interface that gives the data-transfer performance that is closet to a desired level relative to a particular parameter. For example, the device can select and transfer data via the interface that consumes the least power. Furthermore, if the performance of the selected communication interface changes during the data transfer, the device may, without operator input, identify an interface that offers better performance and switch over to the identified interface. Moreover, the device may, without operator input, allow multiple software applications to share one or more communication interfaces, where the number of shared communication interfaces is less than the number of software applications.

DETAILED DESCRIPTION

Figure 1:
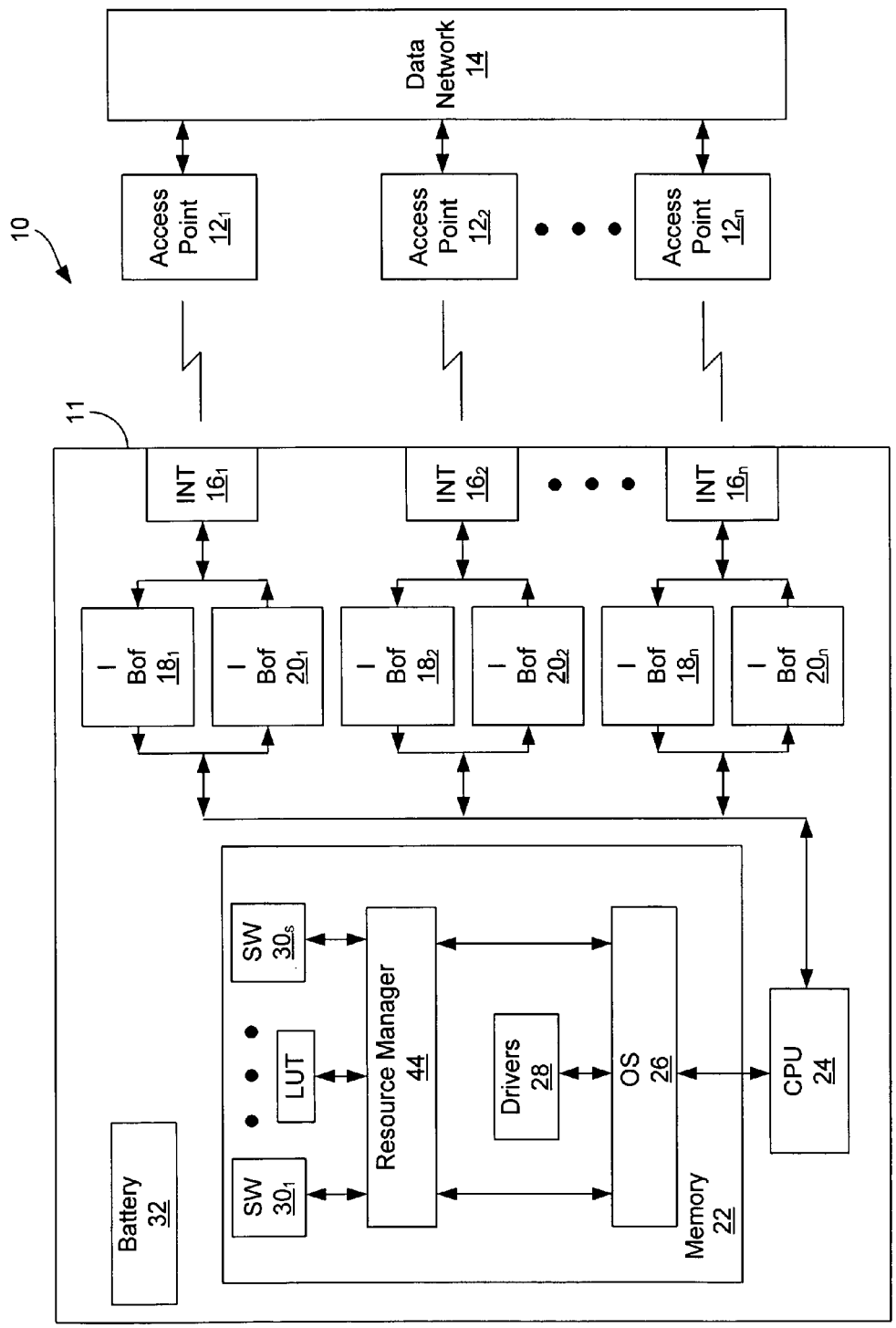
FIG. 1 is a schematic block diagram of a communication system according to an embodiment of the invention.

FIG. 1 is a schematic block diagram of a communication system 10 according to an embodiment of the invention. The system 10 includes a portable electronic device 11 such as a PDA, access points $12_1$-$12_n$, and a data network 14, such as the internet, with which the device communicates via the access points.

The portable electronic device 11 includes multiple wireless communication interfaces $16_1$-$16_n$, one respective input buffer $18_1$-$18_n$ and one respective output buffer $20_1$-$20_n$ for each of the interfaces $16_1$-$16_n$, a memory 22, and a central processing unit (CPU) 24, which typically includes a processor (not shown). The memory 24 stores an operating system 26, drivers 28 for the interfaces 16, one or more software applications $30_1$-$30_s$ (e.g., web browser, email client), and a resource manager 44 (discussed below), and a battery 32 powers the interfaces 16, buffers 18 and 20, memory 22, CPU 24, and other components (not shown) of the device 11. The device 11 may also be powerable via a 110-120 AC wall outlet (not shown).

The access points $12_1$-$12_n$ are each operable to allow the device 11 to communicate with the network 14 via a respective one of the interfaces $16_1$-$16_n$. For example, if the interface $16_1$ is a Bluetooth WPAN interface, then the access point $12_1$ is Bluetooth compatible, and is thus operable to communicate with the interface $16_1$.

In operation, the CPU 24 executes one or more software applications 30 via the operating system 26, and transfers data to/from the data network 14 via the interface or interfaces 16 specified by the resource manager 44. More specifically, the resource manager 44, specifies, without operator (not shown) input, a communication interface 16 that transfers data with a better performance of an operating parameter than other "available" interfaces 16 (an interface is "available" if it is within signal range of its corresponding access point 12 and is otherwise able to transfer the data with the required quality of service, which is discussed below). That is, the performance of the operating parameter by the specified interface 16 is closer to a desired level than the performance of the operating parameter by the other available interfaces. For example, suppose that the operating parameter is power consumption, and that the desired level of power consumption is as close as possible to zero, i.e., the lowest possible power consumption. Therefore, the resource manager 44 causes the CPU 24 to transfer data via the available communication interface 16 that consumes the least power for the current data-transfer rate. Other operating parameters of the interfaces 16 may include signal-to-noise ratio (SNR), bit-error rate, and delay deadline. The resource manager 44 may cause the CPU 24 to transfer data via the available interface 16 that has the highest signal-to-noise ratio (SNR), that provides the lowest bit-error rate (BER) for the current data-transfer rate, or that provides the shortest delay deadline. The delay deadline is the time within which an interface 16 should transmit/receive a data packet or burst having a predetermined size. For example, to stream video at a rate of 30 frames/sec, a video decoder application may specify a delay deadline of 30 milliseconds for each video frame. That is, the video decoder may specify that the interface 16 has to have a new video frame present in the corresponding input buffer 18 at least every 30 milliseconds.

The resource manager 44 may also monitor the performance of an operating parameter by the current data-transferring interface 16, and, without operator (not shown) input, cause the CPU 24 to switch over to a better-performing interface if the monitored performance changes. For example, if the data-transfer rate of an active software application 30 changes, then the resource manager 44 may cause the CPU 24 to switch over to another interface 16 that consumes less power than the current interface does at the new data-transfer rate. By causing the CPU 24 to switch over to the available interface 16 that consumes the least power for the current data-transfer rate, the resource manager 44 can significantly extend the life of the battery 32, and thus can significantly extend the maximum operating time of the device 42, while the device is operating on battery power.

Furthermore, the resource manager 44 may, without operator (not shown) input, cause the CPU 24 to transfer data via a reduced number of interfaces 16 while the CPU is executing multiple software applications 30. For example, suppose two software applications $30_1$ and $30_2$ are active. The resource manager 44 may determine the combined data-transfer rate for these two applications, identify a single interface 16 that can handle the combined data rate, and cause the CPU 24 to transfer the data for both applications via the identified single interface—the identified interface 16 need not be one of the interfaces that an operator (not shown) selected during the setup of the software applications $30_1$ and $30_2$. Transferring all the data via a single interface 16 typically consumes less power than transferring the data via multiple interfaces. And the resource manager 44 may save even more power by causing the CPU 24 to transfer the data via the single available interface 16 that consumes the least power as discussed above.

Still referring to FIG. 1, the LUT 46 stores information that indicates which interface 16 provides the best performance of each operating parameter that the resource manager 44 can recognize. For example, as further discussed below in conjunction with FIG. 3, the LUT 46 may rank the interfaces 16 by power consumed for a number of predetermined data-transfer rates. Therefore, by analyzing the information stored in the LUT 46, the resource manager 44 can cause the CPU 24 to transfer data via the available interface 16 that consumes the least power for the current data-transfer rate as discussed above and below.

When determining which of the interfaces 16 are available to transfer data, the resource manager 44 may only identify as available the interfaces that provide the quality of service specified by the one or more software applications 30. Typically, the quality of service is a measure of the performance of operating parameters other than the operating parameter that the resource manager seeks to optimize, and the one or more software applications 30 provide required performance levels for these other parameters. For example, suppose the resource manager 44 operates to select the available interface 16 that consumes the least power as discussed above. But suppose that the one or more software applications 30 also require that the selected interface provide a quality of service where the maximum delay deadline is 30 milliseconds. This quality-of-service requirement thus prohibits the resource manager 44 from selecting an interface 16 that cannot provide a delay deadline of 30 milliseconds or less. Therefore, in this example, the resource manager 44 selects from the interfaces 16 that can provide a delay deadline of 30 milliseconds or less the interface that consumes the least power. That is, the resource manager 44 optimizes power consumption within the quality-of-service boundaries set by the one or more software applications 30.

Figure 2A:
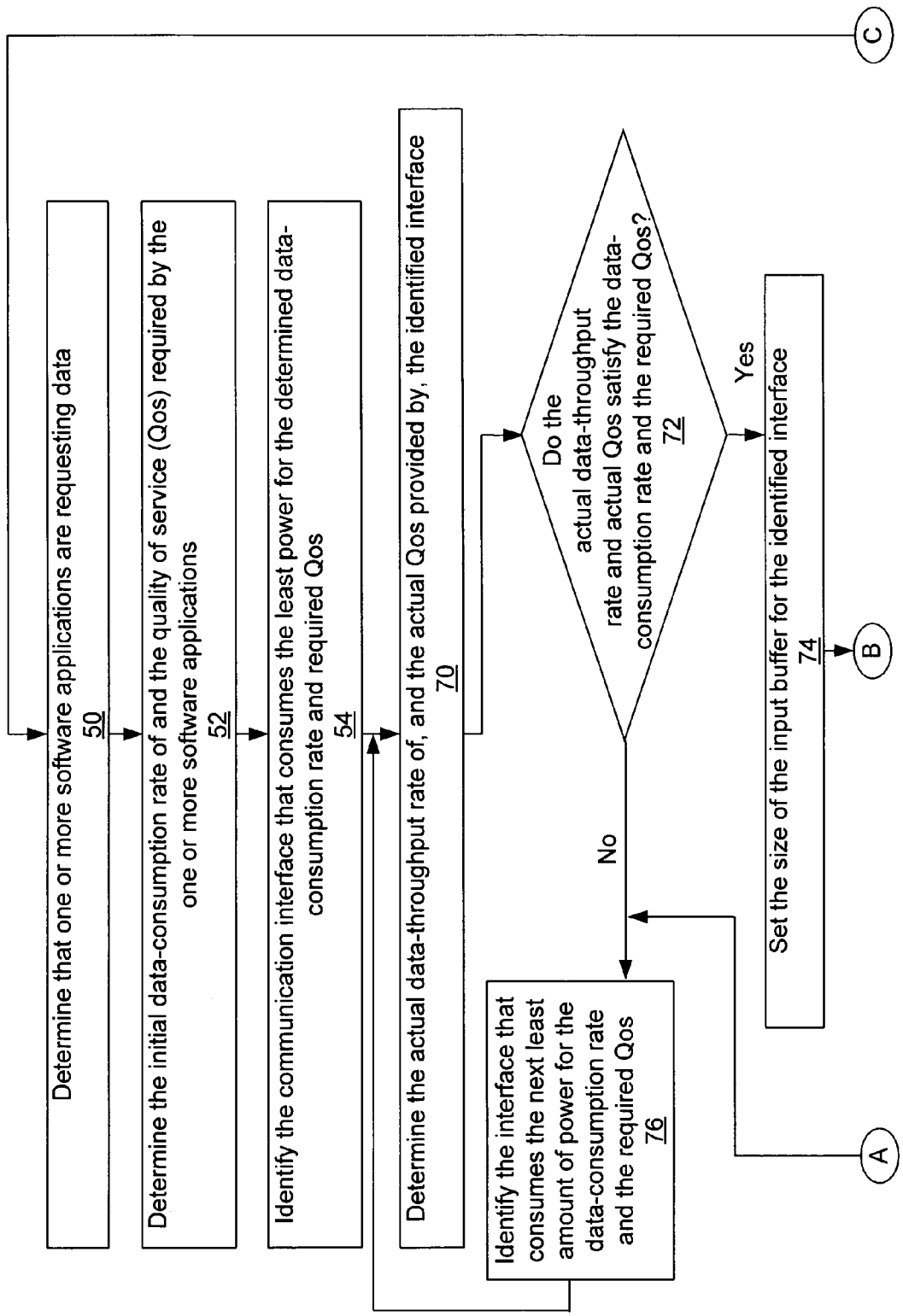
FIGS. 2A and 2B are respective portions of a flowchart that details the operation of the electronic device of FIG. 1 according to an embodiment of the invention.
Figure 2B:
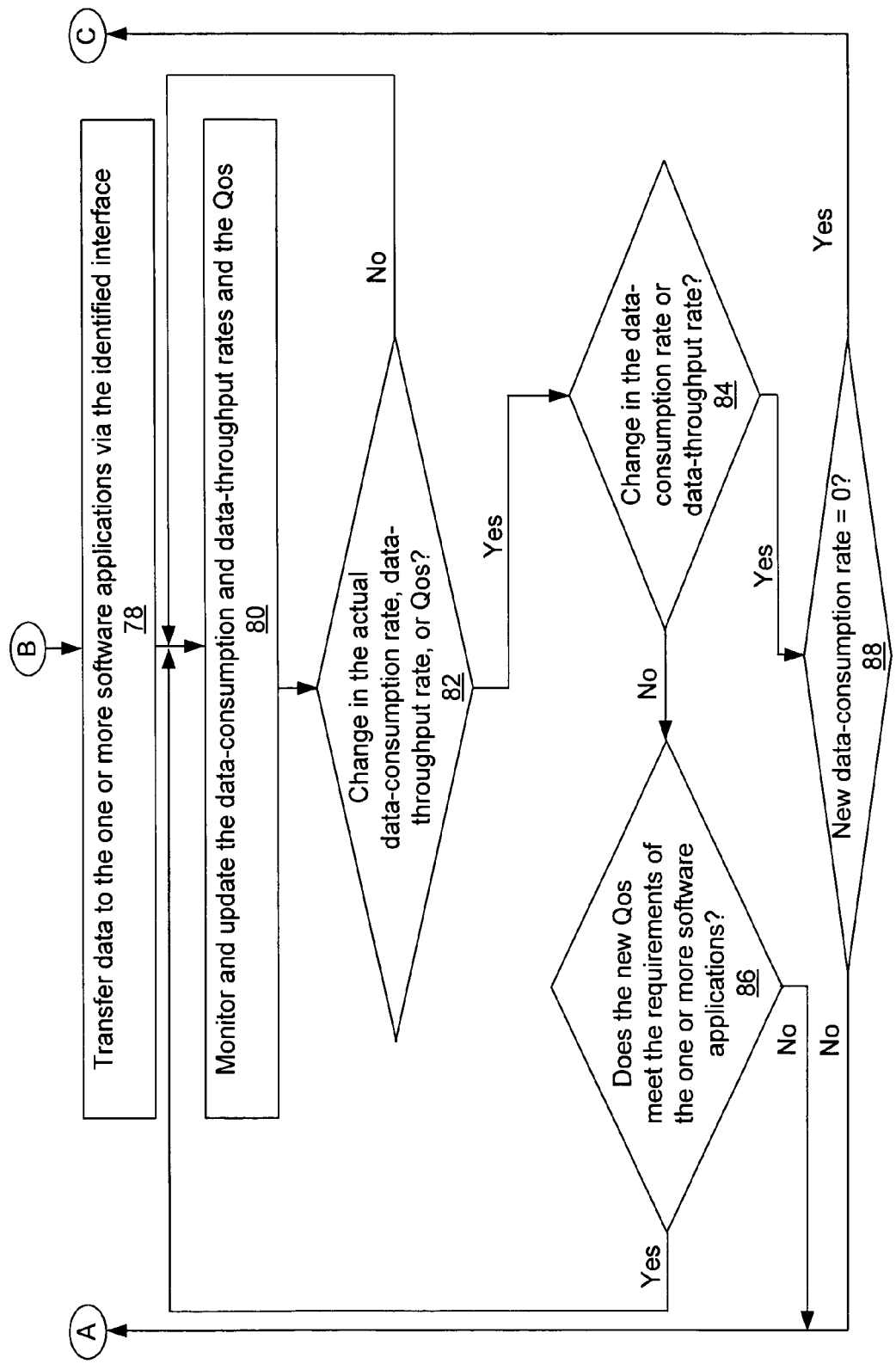

FIGS. 2A and 2B are respective portions of a flowchart that details the operation of the device 42 of FIG. 1 according to an embodiment of the invention where one or more software applications 30 are receiving, i.e., consuming, data from the network 14 via the interface 16 that consumes the least power of all the available interfaces. Although for clarity it may be stated that the operating system 26, one or more software applications 30, and the resource manager 44 perform particular functions or tasks, in actuality the CPU 24 performs these tasks while respectively executing the operating system, the one or more software applications, and the resource manager. Furthermore, unless otherwise indicated, the operation of the device 42 is similar where the one or more software applications 30 are sending data to the network 14, and where the resource manager 44 selects the available interface 16 having the best performance of a parameter other than power consumption, where "best performance" indicates a level of performance closest to a desired level.

Referring to FIGS. 1 and 2A, in step 50 the resource manager 44 determines that one or more software applications 30 are requesting data from the network 14. For example, the software application $30_1$ may be a web browser that is requesting a stream of live video data from the network 14, and the resource manager 44 may detect this request by intercepting it or receiving an indication from the operating system 26.

Next, in step 52, the resource manager 44 determines the initial data-consumption rate $\lambda_\mu$ of the one or more software applications 30 (the rate at which the one or more software applications collectively process the incoming data) and the required quality of service that the one or more software applications require. The resource manager 44 may determine the initial data-consumption rate by, e.g., querying the one or more software applications 30 or loading test data into one or more of the input buffers 18 and measuring the rate at which the one or more applications collectively empty the data from the buffer(s). The resource manager 44 may generate the test data or may transfer the test data transfer from the network 14 via one or more of the interfaces 16. The resource manager 44 typically determines the required quality of service by querying the one or more software applications 30. For example, the software application $30_1$ may be a web browser that specifies a frame playback rate of 15 frames per second for a stream of live video data Then, in step 54, the resource manager 44 accesses the information stored in the LUT 46 and uses this information to identify the interface 16 that consumes the least power for the data-consumption rate and the required quality of service determined in step 52.

Figure 3:
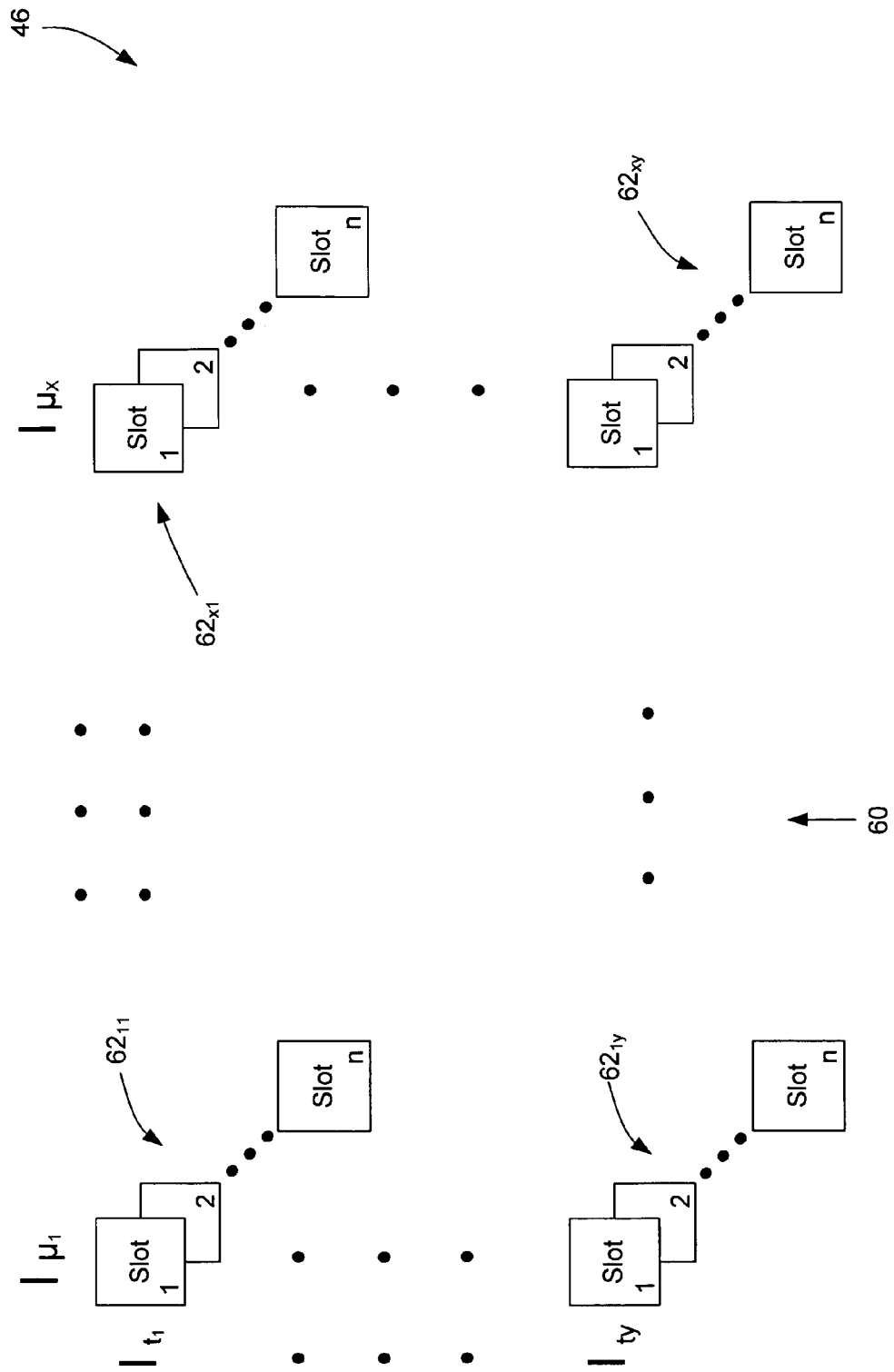
FIG. 3 is a logical block diagram of the look-up table (LUT) of FIG. 1 according to an embodiment of the invention.

FIG. 3 is a logical block diagram of the LUT 46 of FIG. 1 according to an embodiment of the invention.

Referring to FIGS. 1 and 3, the LUT 46 includes an array 60 of locations $62_{11}$-$62_{xy}$, which each rank the interfaces $16_1$-$16_n$ by power consumption for a respective pair of data-consumption rate $\lambda_{\mu x}$ and data-throughput rate $\lambda_{ty}$,—in this embodiment, the data-throughput rate is the rate at which an interface 16 is capable of receiving data—and which each store corresponding performance levels for operating parameters other than power consumption for each interface. As discussed above, these performance levels collectively indicate the quality of service provided by the corresponding interface 16. Furthermore, in the LUT 46,$\lambda_{\mu x}$ and $\lambda_{ty}$ increase with x and y respectively. For example, $\lambda_{\mu 4} > \lambda_{\mu 3}$ and $\lambda_{t2} > \lambda_{t1}$.

Each location 62 is located at the intersection of a corresponding $\lambda_{\mu x}$ and $\lambda_{ty}$ pair, and includes n slots ranked by relative power consumption, one slot for each of the interfaces $16_1$-$16_n$. Slot 1 stores the identity of the interface 16 that consumes the least power for the corresponding $\lambda_\mu$ and $\lambda_t$ pair, the level of power that the identified interfaced consumes, and the data-transfer sequence in which the CPU 24 must operate the identified interface to achieve this level of power. Slot 2 stores the identity of the interface 16 that consumes the second least amount of power for the corresponding pair $\lambda_\mu$ and $\lambda_t$, the level of power that the identified interface consumes, and the data-transfer sequence in which the CPU 24 must operate the identified interface to achieve this level of power. For example, if the location $62_{11}$ stores the identity of the interface $16_3$ in slot 1, then for a data-consumption rate of $\lambda_{\mu 1}$ and a data-throughput rate of $\lambda_{t1}$, the interface 163, operating in the data-transfer sequence stored in slot 1, consumes less power than the other interfaces $16_1$-$16_2$ and $16_4$-$16_n$. Interface data-transfer sequences and techniques for determining which data-transfer sequence causes an interface 16 to consume the least power are discussed below in conjunction with FIG. 6.

The slots 1-n of each location 62 also store the quality of service provided by the respective identified interfaces 16. In the above example where the slot 1 of the location $62_{11}$ stores the identity of the interface $16_3$, slot 1 also stores the performance levels of operating parameters other than power consumption by the interface $16_3$ for the pair $\lambda_{\mu 1}$ and $\lambda_{t1}$. For example, slot 1 of the location $62_{11}$ may store the predetermined BER (the level of data error) of the interface $16_3$ while operating in the data-transfer sequence in slot 1. Methods for predetermining the BER and other performance parameters of the interfaces 16 are discussed below in conjunction with FIG. 6.

Still referring to FIGS. 1 and 3, the locations 62 corresponding to the $\lambda_\mu$ and $\lambda_t$ pairs where $\lambda_t < \lambda_\mu$ are empty. The resource manager 44 considers an interface 16 available to transfer data only if the interface is capable of a data-throughput rate $\lambda_t$ that equals or exceeds the data-consumption rate $\lambda_\mu$ determined in step 52 of FIG. 2A. Therefore, the locations 62 store the identities of interfaces 16 only for the $\lambda_\mu$ and $\lambda_t$ pairs where $\lambda_t \geq \lambda_\mu$. For example, if $\lambda_{t1} < \lambda_{\mu x}$, then the location $62_{x1}$ is empty.

Referring to FIG. 3, although described as including n slots that rank the n interfaces $16_1$-$16_n$ by power consumption, each location 62 may include fewer or more than n slots, and the slots may also rank multiple data-transfer sequences of a single interface 16. For example, the interface $16_1$ may be operable according to two data-transfer sequences, and the slots of each location 62 may rank the power consumption of these two sequences such that two of the slots in each location 62 store the identity of the interface $16_1$, one slot for each of the two data-transfer sequences. Ranking multiple data-transfer sequences of an interface 16 provides more data-transfer options from which the resource manager 44 may select.

Referring to FIGS. 2A and 3, in step 54 the resource manager 44 assumes for the moment that all of the data-throughput rates $\lambda_t$ are available, and thus identifies the lowest-power interface 16 from the slots 1 in the column of locations 62 corresponding to the predetermined data-consumption rate $\lambda_\mu$ that is closest to the initial data-consumption rate determined in step 50. Because the slots 1 store the level of power that the respective identified interfaces 16 consume, the resource manager 44 compares the power levels and identifies the interface 16 corresponding to the lowest level. For example, if the initial data-consumption rate is closest to the predetermined consumption rate $\lambda_{\mu 1}$, then the resource manager first examines the slots 1 of the locations $62_{11}$-$62_{1y}$. Then, the resource manager 44 determines which of the slots 1 of the locations $62_{11}$-$62_{1y}$ stores the lowest power level, and selects the interface 16 identified by this slot 1.

Continuing step 54, the resource manager 44 further examines the slot 1 corresponding to the identified interface 16 to determine whether the stored quality of service meets the level(s) specified by the one or more software applications 30. For example, if the one or more software applications 30 specify a delay deadline of 30 milliseconds, then the resource manager 44 determines whether the delay deadline stored in the slot 1 is less than or equal to the specified delay deadline.

If the quality of service stored in the examined slot 1 meets the level(s) specified by the one or more software applications 30, then the resource manager 44 proceeds to step 70 of FIG. 2A.

If the quality of service stored in the examined slot 1 does not meet the level(s) specified by the one or more software applications 30, then the resource manager 44 examines the remaining slots 1 in the same column of locations 62 until the resource manager finds the lowest-power-consuming interface 16 that meets the specified quality of service. For example, if the resource manager 44 determines that the slot 1 of the location $62_{11}$ stores the identity of the interface 16 having the lowest power consumption for $\lambda_{\mu 1}$, but then determines that this interface does not meet the specified quality of service, then the resource manager selects from the slots 1 of the remaining locations $62_{12}$-$62_{1y}$, the interface 16 that consumes the least power. The resource manager 44 then determines whether this interface 16 meets the specified quality of service. If not, the resource manager 44 continues this procedure until it finds the lowest-power consuming interface 16 that meets the specified quality of service. If none of interfaces 16 stored in the slots 1 meet the specified quality of service, then the resource manager 44 repeats this procedure for the slots 2-n until it finds the interface 16 that has the lowest power consumption and satisfies the specified quality of service.

Referring to FIGS. 1 and 2A, in step 70 the resource manager 44 determines the actual data-throughput rate $\lambda_t$ of and quality of service provided by the interface 16 that the resource manager identified in step 54. The resource manager 44 causes the identified interface 16 to receive data from the corresponding access point 12 while operating in the data-transfer sequence identified by the LUT 46, and measures $\lambda_t$ equal to the rate at which the interface 16 fills the corresponding input buffer 18 with data. If the data composes bursts having a predetermined size, then the resource manager 44 determines $\lambda_t$ by measuring the periods between the arrival of sequential data bursts, averaging these periods, and dividing the product of the number of bursts and the number of bits in each burst by the average arrival period. The resource manager 44 also measures the interface's performance of the quality-of-service parameters by analyzing the received data or the received data signal. For example, the resource manager 44 may determine the coding delay for streaming video by analyzing the data with a known estimation algorithm Referring to FIGS. 1 and 2A, in step 72 the resource manager 44 determines whether the actual data-throughput rate $\lambda_t$ determined in step 70 equals or exceeds the initial data-consumption rate $\lambda_\mu$ (determined in step 52) of the one or more software applications 30, and whether the actual quality of service meets the requirements of the one or more software applications.

If the resource manager 44 determines that the actual data-throughput rate $\lambda_t$ equals or exceeds the initial data-consumption rate $\lambda_\mu$ and that the actual quality of service meets the specified quality of service, then the resource manager proceeds to step 74 of FIG. 2A.

If, however, the resource manager 44 determines that the actual data-throughput rate $\lambda_t$ is less than the initial data-consumption rate $\lambda_\mu$ or that the actual quality of service does not meet the requirements of the one or more software applications 30, then the resource manager determines that the interface 16 identified in step 54 is unavailable, and proceeds to step 76 of FIG. 2A.

Still referring to FIGS. 1 and 2A, in step 76 the resource manager 44 selects the available next least-power-consuming interface 16 in a manner similar to that described above in step 54. One difference, however, is that the resource manager 44 "knows" the actual data-throughput rate $\lambda_t$ of and the actual quality of service provided by the interface 16 identified in step 54 and operating in the specified data-transfer sequence. Consequently, the resource manager 44 eliminates from consideration this interface 16 operating in this data-transfer sequence. For example, suppose that in step 54 the resource manager 44 identified the interface $16_3$ operating in the data-transfer sequence specified in slot 1 of the location $62_{11}$, but that in step 70 the resource manager determined that $\lambda_t$ of the interface $16_3$ is less than the initial data-consumption rate determined in step 52. Furthermore, suppose that slot 1 of the location $62_{1y}$ identifies as the next least-power-consuming option for $\lambda_{\mu 1}$ the interface $16_3$ operating in the same data-transfer mode. Because the resource manager 44 already has determined that the actual $\lambda_t$ of the interface $16_3$ is lower than the initial data-consumption rate, the resource manager "ignores" the contents of slot 1 of the location $62_{1y}$ and searches for the available interface 16 that consumes the next-lowest level of power in the manner described above in conjunction with step 54.

If necessary, the resource manager 44 performs and repeats steps 76, 70, and 72 until the resource manager identifies the available interface 16 that, while operating in the specified data-transfer sequence, has a sufficient data-throughput rate $\lambda_t$, provides the required quality of service, and consumes the least power.

Figure 4:
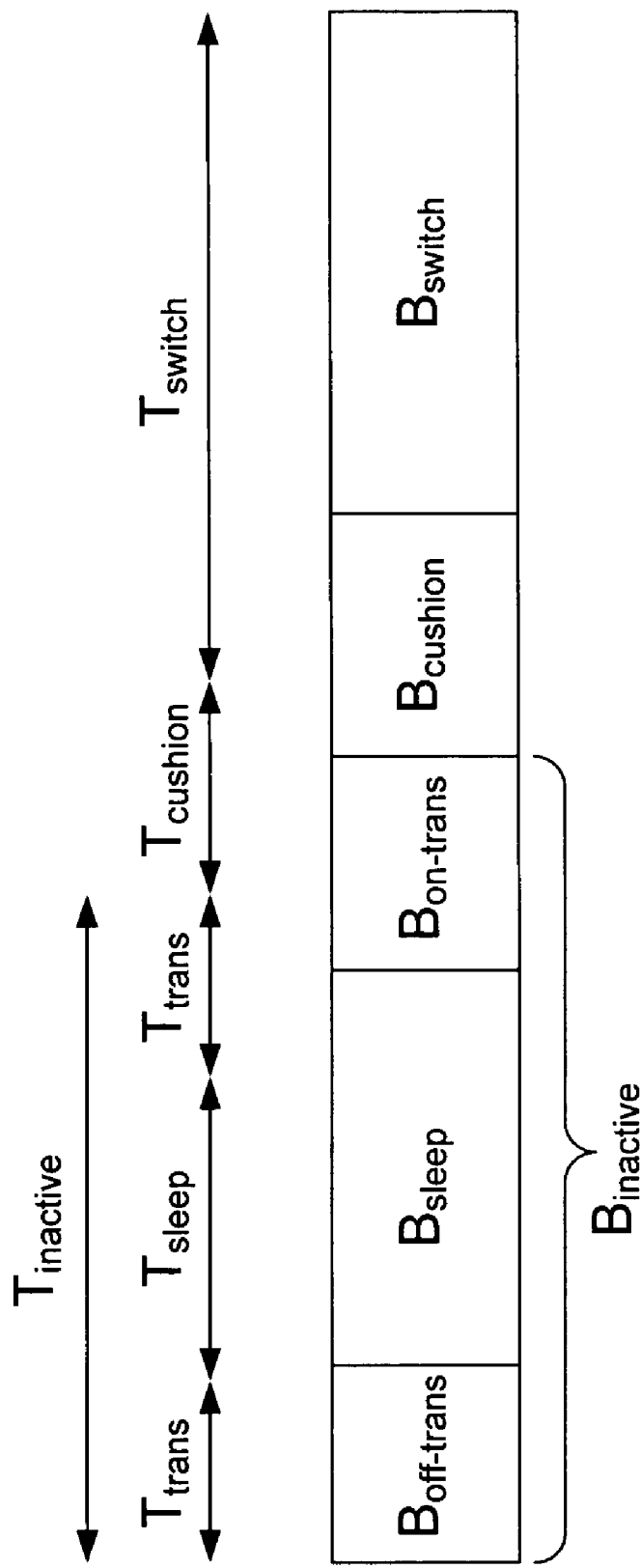
FIG. 4 illustrates a procedure for calculating the size of a data-transfer buffer of the electronic device of FIG. 1 according to an embodiment of the invention.

FIG. 4 illustrates a procedure for calculating the size of a data-transfer buffer of the electronic device of FIG. 1 according to an embodiment of the invention.

Referring to FIGS. 1, 2A, and 4, in step 74 the resource manager 44 sets the size of the input buffer 18 for the available least-power-consuming interface 16 that the resource manager identified in step 54 or step 76. Generally, the larger the input buffer 18, the more power that the buffer consumes, but the smaller the input buffer, the more likely that the one or more software applications 30 will completely empty the buffer, and thus be forced to enter a wait state until the buffer refills. Such a wait state may cause data loss or other errors in tasks such as the streaming of live video or audio. Therefore, to avoid such a wait state, the resource manager 44 ideally sets the size of the input buffer 18 to be just large enough to prevent the one or more software applications 30 from running out of data during periods when the interface 16 is inactive, i.e., not filling the buffer.

The resource manager 44 sets the buffer size B according to the following equation:

$$B = B_{inactive} + B_{switch} + B_{cushion} \quad (1)$$

where $B_{inactive}$ is proportional to the predetermined maximum time $T_{inactive}$ that the interface 16 is inactive, $B_{switch}$ is proportional to the predetermined maximum time $T_{switch}$ required to switch from one interface 16 to another as discussed below in conjunction with steps 80-88, and $B_{cushion}$ compensates for an estimated error in the calculation of $B_{inactive}$ and $B_{switch}$.

The resource manager 44 determines $B_{inactive}$ according to the following equation:

$$B_{inactive} = B_{sleep} + B_{off\text{-}trans} + B_{on\text{-}trans} \quad (2)$$

where $B_{sleep}$ is proportional to the predetermined maximum time $T_{sleep}$ that the interface 16 is in a sleep mode, $B_{off\text{-}trans}$ is proportional to the predetermined maximum time $T_{off\text{-}trans}$ required for the interface to "turn off" and enter a "sleep" mode from a data-transfer mode, and $B_{on\text{-}trans}$ is proportional to the predetermined maximum time $T_{on\text{-}trans}$ required for the interface to "turn on" and re-enter the data-transfer mode from a sleep mode. As discussed below in conjunction with FIG. 6, an interface 16 typically consumes less power in a sleep mode than in an active mode. Therefore, the data-transfer sequence of the interface 16 may include one or more sleep modes to conserve power between data-receiving periods. Consequently, the resource manager 44 sets $B_{inactive}$ such that the input buffer 18 can provide an uninterrupted data flow to the one or more software applications 30 while the interface 16 is "asleep."

Still referring to FIGS. 1, 2A, and 4 and continuing step 74, the resource manager 44 calculates $B_{sleep}$, $B_{off\text{-}trans}$, $B_{on\text{-}trans}$, $B_{switch}$, and $B_{cushion}$ according to the following equations:

$$B_{sleep} = (T_{sleep} \lambda_t \lambda_\mu)/(\lambda_t - \lambda_\mu) \quad (3)$$

$$B_{off\text{-}trans} = (T_{off\text{-}trans} \lambda_t \lambda_\mu)/(\lambda_t - \lambda_\mu) \quad (4)$$

$$B_{on\text{-}trans} = (T_{on\text{-}trans} \lambda_t \lambda_\mu)/(\lambda_t - \lambda_\mu) \quad (5)$$

$$B_{switch} = T_{switch} \lambda_\mu \quad (6)$$

$$B_{cushion} = T_{cushion}(\lambda_t(1-\chi) - \lambda_\mu(1+\delta)) \quad (7)$$

where $\chi$ is the estimated error in $\lambda_t$, which the resource manager determined in step 70, and $\delta$ is the estimated error in $\lambda_\mu$, which the resource manager determined in step 50. One technique for determining $\chi$ and $\delta$ is discussed below in conjunction with step 80 of FIG. 3B. In one example, $\chi=\delta=0.5\%=0.005$.

Still continuing step 74, there is a minimum buffer size $B_{min}$ below which the active interface 16 consumes more power by entering the sleep mode than by remaining active. The interface 16 typically consumes more power while entering and exiting a sleep mode than it does in an active mode. But as long as the buffer 18 is large enough, the device 42 realizes a net power savings because the power saved while the interface 16 is asleep exceeds the power consumed entering and exiting the sleep mode. $B_{min}$ is the "break-even" buffer size where the interface 16 consumes the same amount of power remaining in the active mode as it does entering the sleep mode, and is given by the following equation:

$$B_{min}=(T_{be}\lambda_t\lambda_\mu)/(\lambda_t-\lambda_\mu) \quad (8)$$

$T_{be}$ is the break-even time for remaining in the sleep mode (the time in the sleep mode below which there is a power penalty for entering the sleep mode), and is given by the following equation:

$$T_{be}=T_{trans}+T_{trans}(P_{trans}-P_{active})/(P_{active}-P_{sleep}) \quad (9)$$

where $T_{trans}$ is the time that the interface 16 needs to enter and exit the sleep mode, $P_{trans}$ is the power that the interface consumes entering and exiting the sleep mode, $P_{active}$ is the power that the interface consumes in the active mode, and $P_{sleep}$ is the power that the interface consumes in the sleep mode. $T_{trans}$ and $P_{trans}$ are given by the following equations:

$$T_{trans}=T_{off\text{-}trans}+T_{on\text{-}trans} \quad (10)$$

$$P_{trans}=P_{on\text{-}trans}+P_{off\text{-}trans} \quad (11)$$

Consequently, to increase the power savings by entering the interface 16 into the sleep mode, the resource manager 44 sets the buffer size B according to the following equation, where $B_{max}$ is the maximum buffer size that the memory 22 will allow for the input buffer 18:

$$B_{min} \leq B \leq B_{max} \quad (12)$$

Still referring to FIGS. 1 and 2A, to calculate the buffer size B for an output buffer 20 where the one or more software applications 30 produce data for transmission to the network 14 and load this data into the output buffer, the resource manager 44 can use the equations (1)-(12) after swapping $\lambda_t$ for $\lambda_\mu$ and $\lambda_\mu$ for $\lambda_t$ in equations (3)-(8).

The calculation of the buffer size B and of the power that the interface 16 consumes versus B is further discussed in "Heterogeneous Wireless Network Management," W. Quadeer, T. Simunic, J. Ankcorn, V. Krishnan, G. De Micheli, Proceedings of PACS'03, pp. 101-112, December 2003, which is incorporated by reference.

Referring to FIGS. 1 and 2B, after setting the size B of the input buffer 18, in step 78 the resource manager 44 causes the identified interface 16 to begin receiving data from the network 14 via the corresponding access point 12, and filling the input buffer with this received data. The resource manager 44 also causes the CPU 24 to begin processing the data in the input buffer 18 under the control of the one or more software applications 30. For example, if the data in the input buffer 18 is MPEG video data, then the CPU 24 decodes this data and forms viewable video frames from the decoded data.

Next, in step 80, the resource manager 44 monitors the combined data-consumption rate $\lambda_\mu$ of the one or more software applications 30, and monitors the data-throughput rate $\lambda_t$ and the quality of service provided by the active interface 16 for one or more parameters.

Figure 5:
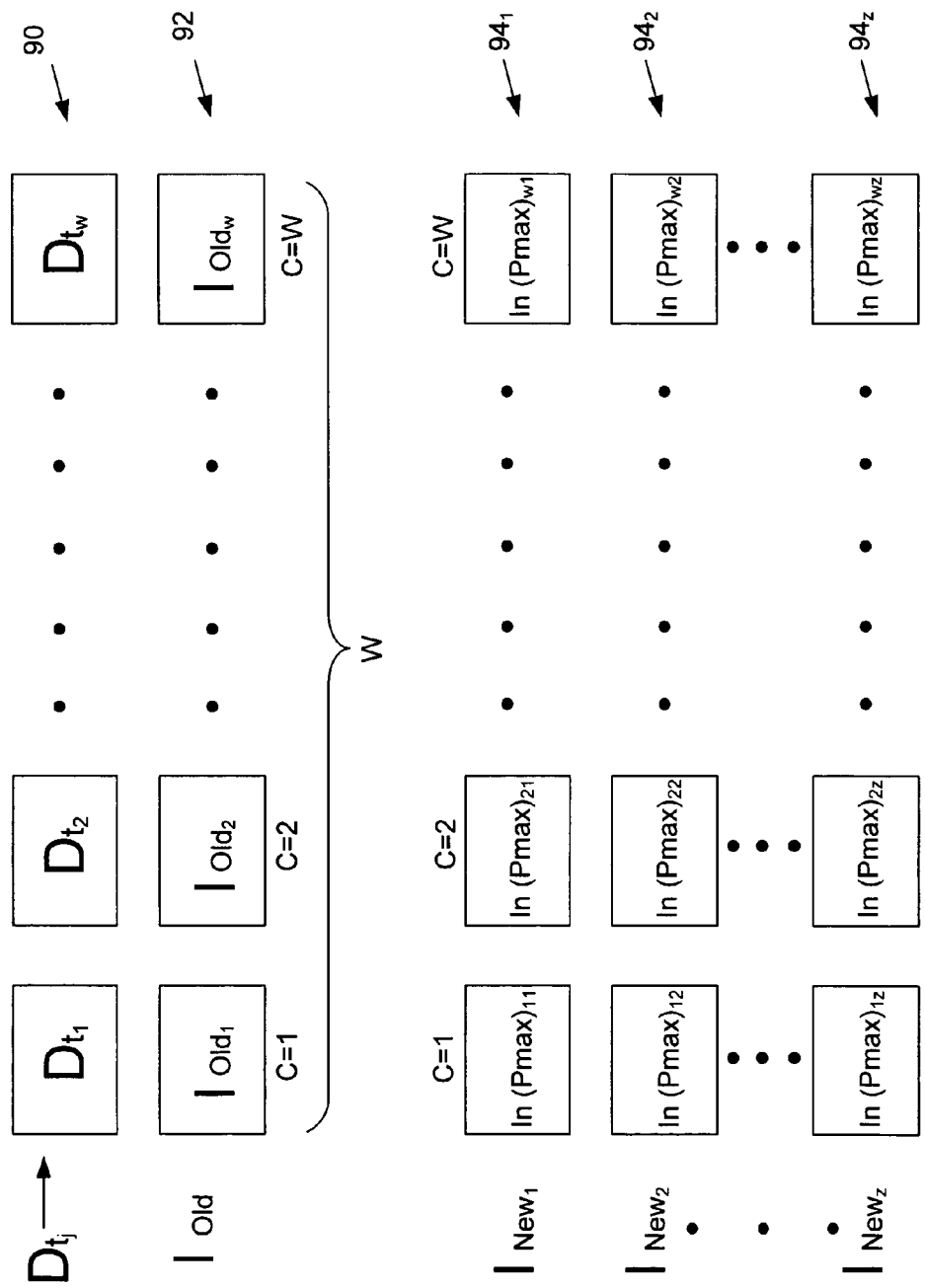
FIG. 5 is a diagram of the registers used by an algorithm that, according to an embodiment of the invention, determines whether the rates at which the device of FIG. 1 is processing and transferring data have changed.

Referring to FIGS. 1 and 5, the resource manager 44 monitors $\lambda_\mu$ using the following maximum-likelihood equation:

$$In(P_{\max}) = (w - c + 1)In(\lambda_{new}/\lambda_{oldc}) - (\lambda_{new}/\lambda_{oldc})\sum_{j=c}^{w} \Delta tj \quad (13)$$

where $\lambda_{new}$ is the predetermined possible "new" values of $\lambda_\mu$, $\lambda_{oldc}$ is the value of $\lambda_\mu$ that the resource manager 44 calculated for the burst of data that the one or more software applications 30 consumed at a time corresponding to c, $\Delta t_j$ is the time between the start of consumption of consecutive data bursts, w is the length of path-history registers 90, 92, and $94_1$-$94_z$, c is a respective location within the registers 90, 92, and 94, and $In(P_{max})$, where $P_{max}$ is less than or equal to 1, is the natural log of the probability that $\lambda_\mu$ has changed to $\lambda_{new}$ at a time corresponding to a location c. The registers 90, 92, and 94 may compose part of the resource manager 44, the LUT 46, or may reside in another portion of the memory 22.

Referring to FIG. 5, the calculation of equation (13) and the analysis of its results are discussed.

The resource manager 44 is programmed with a predetermined threshold value $Threshold_{\lambda_\mu}$ for $In(P_{max})$. If for a particular value of c $In(P_{max})$ equals or exceeds $Threshold_{\lambda_\mu}$, then the resource manager 44 determines that at the time corresponding to this value of c, the data-consumption rate $\lambda_\mu$ changed to $\lambda_{new}$. $Threshold_{\lambda_\mu}$ is related to $\delta$ (the estimated error in $\lambda_\mu$) of equation (7) according to the following equation:

$$Threshold=1-\delta \quad (14)$$

For example, if $\delta=0.005=0.5\%$ as discussed above in conjunction with equation (7), then $Threshold_{\lambda_\mu}=0.995=99.5\%$ to account for the estimated error in the determination of $\lambda_\mu$. Therefore, in this example, the resource manager 44 determines that $\lambda_\mu$ has changed to $\lambda_{new}$ if the probability of this change ($In(P_{max})$) is greater than or equal to 99.5%.

For each burst of data that the one or more software applications 30 unload from the input buffer 18, the resource manager 44 measures $\Delta t_j$. More specifically, at a time $t_0$, the one or more software applications 30 begin to unload a first data burst, and at a time $t_1$ the one or more software applications begin to unload a second data burst. Therefore $\Delta t_1=t_1-t_0$.

Next, the resource manager 44 right shifts the current value of $\Delta t_1$ into the register 90, thus also right shifting the previously stored values of $\Delta t_j$. Because the register 90 is w locations long, the register 90 stores the w most recent values of $\Delta t_j$.

Then, the resource manager 44 calculates $\lambda_{old1}$=(data burst size)/$\Delta t_1$ and right shifts $\lambda_{old1}$ into the register 92, thus also right shifting the previously stored values of $\lambda_{oldc}$. Because the register 92 is w locations long, the register stores $\lambda_{old1}$-$\lambda_{oldw}$, which are the w most recent values of $\lambda_{oldc}$. Typically, the one or more software applications 30 unload from the input buffer 18 data bursts. Therefore, the resource manager 44 calculates $\lambda_{old1}$ as the quotient of the data-burst size over $\Delta t_1$. The resource manager 44 may be programmed with the predetermined size of the data burst, or may determine the size of the data burst by conventionally counting the number of bits that one or more software applications 30 unload during the time $\Delta t_1$.

Next, the resource manager 44 calculates $\ln(P_{max})$ for each of z predetermined values $\lambda_{new1}$-$\lambda_{newz}$ over the range c=1→w. Typically, the software applications 30 have a finite number of predetermined data-consumption rates $\lambda_\mu$. By combining these predetermined rates to account for multiple software applications 30 sharing an interface 16, one can typically determine all of the possible data-consumption rates $\lambda_{new1}$-$\lambda_{newz}$ that the software applications support, and store $\lambda_{new1}$-$\lambda_{newz}$ in the LUT 46 (FIG. 2). Therefore, starting with $\lambda_{new1}$, the resource manager 44 calculates $\ln(P_{max})$ according to equation (13) for all values of c, and this calculation yields w results $\ln(P_{max})_{11}$-$\ln(P_{max})_{w1}$. While calculating equation (13) w times, the resource manager 44 obtains the values of $\Delta t_j$ and $\lambda_{oldc}$ from the registers 90 and 92, respectively. The resource manager 44 then calculates $\ln(Pmax)$ in a similar manner for each of the remaining possible new data-consumption rates $\lambda_{new2}$-$\lambda_{newz}$.

Then, the resource manager 44 stores the values calculated for $\ln(P_{max})$ in the registers $94_1$-$94_z$. For example, the resource manager 44 stores in the register $94_1$ the values $\ln(P_{max})_{11}$-$\ln(P_{max})_{w1}$ calculated for $\lambda_{new1}$, stores in the register $94_2$ the values $\ln(P_{max})_{12}$-$\ln(P_{max})_{w2}$ calculated for $\lambda_{new2}$, . . . , and stores in the register $94_z$ the values $\ln(P_{max})_{1z}$-$\ln(P_{max})_{wz}$ calculated for $\lambda_{newz}$.

Next, the resource manager 44 identifies the greatest value of $\ln(P_{max})$ in each register $94_1$-$94_z$, compares these identified values to $\text{Threshold}_{\lambda\mu}$ of equation (14), and retains only those identified values that are greater than or equal to $\text{Threshold}_{\lambda\mu}$. More specifically, the resource manager 44 determines the greatest of $\ln(P_{max})_{11}$-$\ln(P_{max})_{w1}$ in the register $94_1$, and compares this value to $\text{Threshold}_{\lambda\mu}$. If this value is greater than or equal to $\text{Threshold}_{\lambda\mu}$, then the resource manager 44 retains this value; otherwise, the resource manager retains no value from the register $94_1$. The resource manager 44 also performs this same procedure for the values of $\ln(P_{max})$ stored in the registers $94_2$-$94_z$.

Then, the resource manager 44 compares the retained values from the registers $94_1$-$94_z$ to each other, and retains only the greatest of these values. For example, if the resource manager 44 retains values from only the registers $94_1$ and $94_2$ per the preceding paragraph, then the resource manager compares these two values to each other and retains the greatest one of these values.

If the resource manager 44 retains no values of $\ln(P_{max})$ from the registers 94 (i.e., none of the values in the registers $94_1$-$94_z$ is greater than or equal to $\text{Threshold}_{\lambda\mu}$), then the resource manager determines that the data-consumption rate $\lambda_\mu$ has not changed.

If, however, the resource manager 44 identifies from the registers $94_1$-$94_z$ a value of $\ln(P_{max})$ that is greater than or equal to $\text{Threshold}_{\lambda\mu}$, then the resource manager determines that the data-consumption rate $\lambda_\mu$ has changed to the $\lambda_{new}$ corresponding to the register 94 containing the highest value. For example, if the resource manager 44 determines that the greatest value of $\ln(P_{max}) \geq \text{Threshold}_{\lambda\mu}$ is in the register $94_2$, then the resource manager determines that the data-consumption rate $\lambda_\mu$ of the one or more software applications has changed to $\lambda_{new2}$.

The general maximum-likelihood algorithm on which equation (13) is based is discussed in R. Lyman Ott, Micheal T. Longnecker, "An Introduction to Statistical Methods and Data Analysis", Duxbury Press, 5th edition, Dec. 20, 2000, which is incorporated by reference.

Reasons for a change in the data-consumption rate $\lambda_\mu$ include the activation of an additional software application 30 or the inactivation of a previously active software application, a software application completing its download of requested data, or the device 42 entering a power-savings mode and reducing its system-clock frequency.

Still referring to FIGS. 1, 2B, and 5, in step 80 the resource manager 44 also monitors the data-throughput rate $\lambda_t$ of the active interface 16 in a similar manner but with a few differences. Equation (13) is modified such that $\lambda_{new1}$-$\lambda_{newy}$ are the y predetermined possible "new" values of $\lambda_t$, $\lambda_{old1}$-$\lambda_{oldw}$ are the data-throughput values that the resource manager 44 calculates for the most recent w bursts of data that the interface 16 receives, and $\Delta t_j$ is the period between the initial arrival times of consecutive data bursts. Because each interface 16/access-point 12 pair typically has a finite number of possible data-throughput rates, one can determine $\lambda_{new1}$-$\lambda_{newy}$ and program the resource manager 44 with these values. A set of registers (not shown) similar to the registers 90-94 of FIG. 5 store $\Delta t_1$-$\Delta tw$, $\lambda_{old1}$-$\lambda_{oldw}$, and the results of the modified equation (13) for c=1→w for each of $\lambda_{new1}$-$\lambda_{newy}$. This set of registers may compose part of the resource manager 44, the LUT 46, or may reside in another portion of the memory 22. In addition, the resource manager 44 uses the following equation in place of equation (14).

$$\text{Threshold}_{\lambda_t} = 1 - \chi \qquad (15)$$

where $\chi$ is the estimated error in $\lambda_t$ as discussed above in conjunction with equation (7). For example, if $\chi=0.005$, then $\text{Threshold}_{\lambda_t}=0.995=99.5\%$ to account for the estimated error in the determination of $\lambda_t$.

Reasons for a change in the data-throughput rate $\lambda_t$ include changes in the communication channel between the interface 16 and access point 12 such that the interface 16 requests the access point 12 to reduce $\lambda_t$ or the access point reduces $\lambda_t$ unilaterally. For example, an access point 12 operating according to the IEEE 802.11 standard may change the data-transmission rate, thus altering $\lambda_t$, based on the transmission characteristics of the communication channel between the access point and the corresponding active interface 16.

Still referring to FIGS. 1 and 2B, in step 80 the resource manager 44 also monitors the quality of service that the active interface 16 provides for the one or more quality-of-service parameters that the software applications 30 specify. There are multiple ways that the resource manager 44 monitors the quality of service. For example, the resource manager 44 may associate a quality of service with the data-consumption rate $\lambda_\mu$, and thus detect a change in the quality of service in response to detecting a change in $\lambda_\mu$. Or, the resource manager 44 may employ one or more algorithms other than equation (13) to detect a change in the quality of service. For example, the resource manager 44 may monitor the decoding delay of streaming video and detect any changes in this delay.

Referring to FIGS. 1 and 2B, in step 82, if there is no change in any of the data-consumption rate $\lambda_\mu$, data-throughput rate $\lambda_t$, and quality of service, then the resource manager 44 continues monitoring these values per step 80.

If, however, the resource manager 44 does detect a change in $\lambda_\mu$, $\lambda_t$, or quality of service, then the resource manager proceeds to step 84.

In step 84, if the resource manager 44 detects a change in quality of service but no changes in the data-consumption rate $\lambda_\mu$ or data-throughput rate $\lambda_t$, then the resource manager proceeds to step 86.

In step 86 the resource manager 44 determines whether the changed quality of service still meets the requirements of the one or more software applications 30. If the changed quality of service still meets the requirements of the one or more software applications 30, then the resource manager 44 returns to step 80 and continues monitoring the data-consumption rate $\lambda_\mu$, data-throughput rate $\lambda_t$, and quality of service. But if the changed quality of service does not meet the requirements of the one or more software applications 30, then the resource manager 44 returns to step 76 and, as discussed above, identifies a new interface 16 and/or data-transfer sequence that provides the required quality of service and that consumes the least power as compared to the other interfaces 16 and/or data-transfer sequences that can provide the required quality of service.

Referring again to step 84, if the resource manager 44 does detect a change in the data-consumption rate $\lambda_\mu$ or data-throughput rate $\lambda_t$, then the resource manager proceeds to step 88.

In step 88, the resource manager 44 determines whether the one or more software applications 30 are continuing to consume data, i.e., whether the data-consumption rate $\lambda_\mu$ is zero. If the data-consumption rate $\lambda_\mu$ is zero, then the resource manager 44 returns to step 50 of FIG. 3A and waits for one or more software applications 30 to begin consuming data. But if the data-consumption rate $\lambda_\mu$ is not zero, then the resource manager 44 returns to step 76 of FIG. 2A and identifies the available interface 16 that consumes the least power for the new data-consumption rate $\lambda_\mu$ and/or the new data-throughput rate $\lambda_t$.

Referring to FIGS. 1, 2A, and 2B, other embodiments are contemplated for the operation of the resource manager 44 while the one or more software applications 30 are consuming data. For example, the resource manager 44 may perform the steps 50-88 in a different order, omit some of the steps, or perform additional steps. Furthermore, the resource manager 44 may select the available interface 16 having the best performance relative to an operating parameter other than power consumption. For example, if the operator (not shown) of the device 42 pays for transferring data via the interfaces 16, then the resource manager 44 may select the available interface 16 that can transfer data for the best, i.e., lowest, cost. Moreover, the resource manager 44 may monitor the voltage level of the battery 32, and limit the one or more software applications 30 to a data-consumption rate that is no higher than a predetermined maximum rate established for the battery voltage level.

Referring to FIGS. 1-5, where one or more software applications 30 produce data, the resource manager 44 identifies and activates for transmitting the data the available interface 16 that consumes the least power, and monitors the data-production rate $\lambda_p$ of the one or more software applications and the corresponding data-throughput rate $\lambda_t$ of the interface 16 in a manner similar to that discussed above. The resource manager 44 determines the actual data-production rate $\lambda_p$ (i.e., $\lambda_{old}$ in equation (13) for monitoring changes in $\lambda_p$) by measuring the rate at which the one or more software applications 30 fill the corresponding output buffer 20, and determines the actual data-throughput rate (i.e., $\lambda_{old}$ in equation (13) for monitoring changes in $\lambda_t$) by measuring the rate at which the interface 16 empties the corresponding output buffer. Furthermore, where the one or more software applications 30 both consume and produce data, the interface 16 that the resource manager 44 uses to receive the data consumed by the one or more software applications 30 may be different than the interface 16 that the resource manager 44 uses to transmit the data produced by the one or more software applications.

Figure 6:
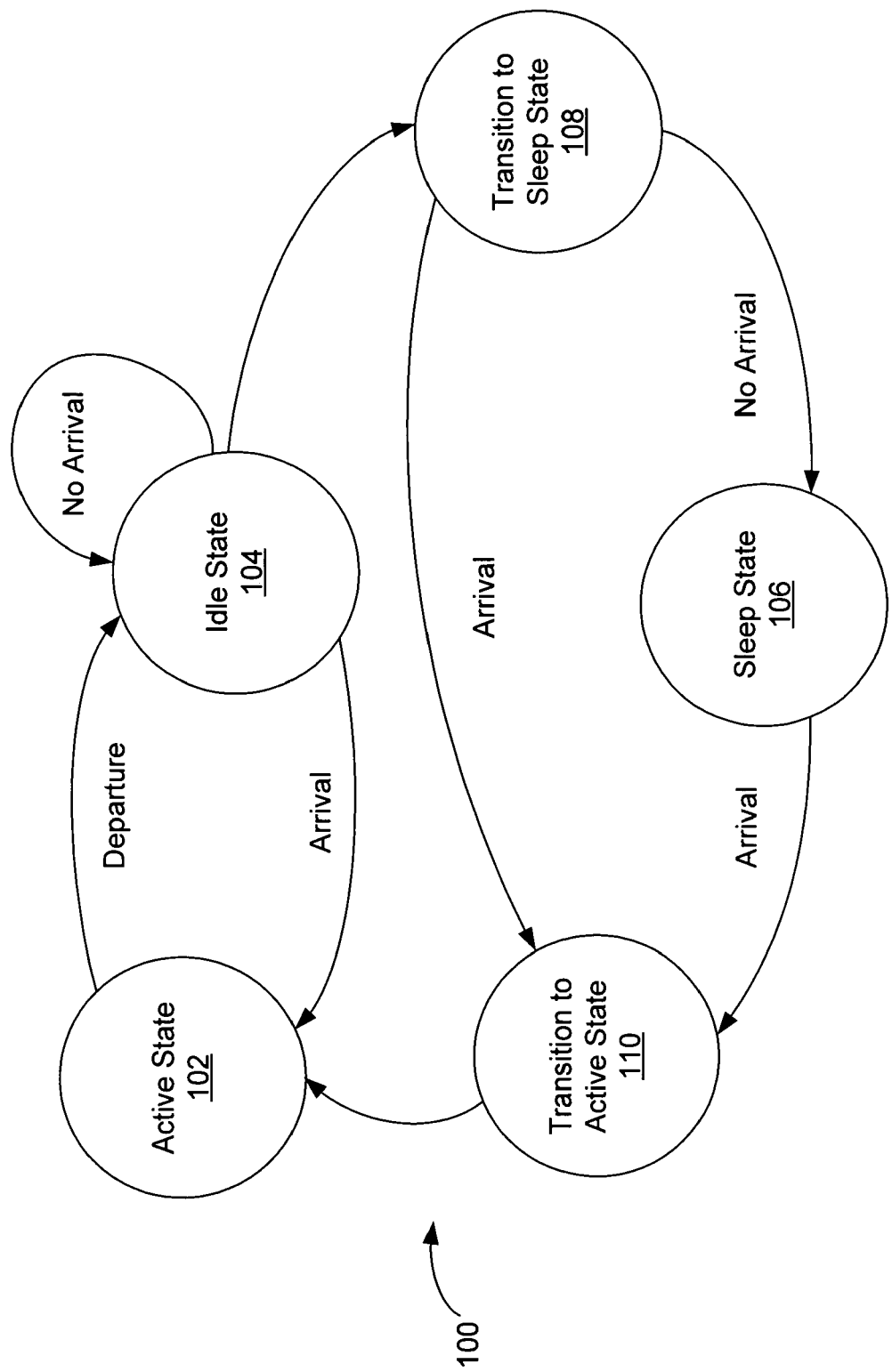
FIG. 6. is a state diagram of a data-transfer sequence that one or more of the communications interfaces of FIG. 1 can implement according to an embodiment of the invention.

FIG. 6 is a diagram of a data-transfer sequence 100 according to which one or more of the interfaces 16 (FIG. 2) operate in an embodiment of the invention. The data-transfer sequence 100 includes an active state 102 during which the interface 16 receives or transmits data, an idle state 104 during which the interface is not receiving or transmitting data but is immediately ready to do so, a sleep state 106 during which the interface is not receiving or transmitting data and is not immediately ready to do so, and transition states 108 and 110 to and from the sleep state. If data arrives while the interface 16 is in the idle state 104, sleep state 106, or transition state 108 or 110, then the interface transitions to the active state 102 either directly or indirectly via the "arrival" branches. Each interface 16 may also be operable in other data-transfer sequences. For example, other data-transfer sequences may omit the sleep state 106, or may include additional levels of sleep states.

As discussed above in conjunction with step 54 of FIG. 2A and FIG. 3, one determines the lowest-power data-transfer sequence of each interface 16 for a particular $\lambda_\mu/\lambda_t$ pair, and stores this sequence in the LUT 46 along with the performance levels of other operating parameters, these performance levels collectively composing the quality of service provided by the corresponding interface. One may also determine for each interface 16 and particular $\lambda_\mu/\lambda_t$ pair the data-transfer sequence having the next-lowest power consumption, and so on, and store these sequences and corresponding quality of service in the LUT 46 to increase the number of data-transfer options available to the resource manager 44. One typically determines the power consumption of and the quality of service provided by an interface 16 by testing the interface as it operates according to the desired data-transfer sequence, and measuring the actual power consumed and the performance of the quality-of-service parameters at different values of $\lambda_\mu$ (or $\lambda_p$) and $\lambda_t$.

Still referring to FIG. 6 and as discussed above in conjunction with equations (8) and (9), although the interface 16 consumes less power in the sleep state 106 than it does in the idle state 104 while awaiting data, the interface must remain in the sleep state for a predetermined minimum time $T_{be}$ to realize a net power savings. That is, for the interface 16 to realize a net power savings, the amount of power saved while in the sleep state 106 must exceed the amount of power consumed during the transitions 108 and 110.

Therefore, the power that an interface 16 consumes depends on the data-consumption rate $\lambda_\mu$/data-production rate $\lambda_p$ of the one or more software applications 30, and the data-throughput rate $\lambda_t$ of the interface.

Generally, for a given buffer size, the lower $\lambda_\mu/\lambda_p$ and the higher $\lambda_t$, the more time the interface 16 can be in the sleep state 106, and thus the less power the interface consumes. Specifically, the higher $\lambda_t$, the more quickly the interface 16 can fill/empty the buffer 18/20, and, for a given $\lambda_\mu/\lambda_p$, the more time that the interface can spend in the sleep state 106. Similarly, the lower $\lambda_\mu/\lambda_p$, the more infrequently the interface 16 can fill/empty the buffer 18/20, and, for a given $\lambda_t$, the more time that the interface can spend in the sleep state 106.

Consequently, for each $\lambda_\mu/\lambda_t$ and $\lambda_p/\lambda_t$ pair, one can determine the lowest-power data-transfer sequence of each interface 16.

But making this determination using the average values of $\lambda_\mu$, $\lambda_p$, and $\lambda_t$ may not yield the lowest-power data-transfer sequence of an interface 16. As discussed above in conjunction with equation (13), the resource manager 44 effectively monitors the average data-consumption rate $\lambda_\mu$ (and/or the average data-production rate $\lambda_p$) and the average data-throughput rate $\lambda_t$. But the inter-arrival times $\Delta t_j$ of the data bursts are typically not constant, hence the determining of an average in equation (13). Therefore, causing an interface 16 to enter the sleep state 106 based on an assumption that $\Delta t_j$ is constant over all j may not yield the lowest power consumption for the interface.

Consequently, for each $\lambda_\mu/\lambda_t$ and $\lambda_p/\lambda_t$ pair, one can, according to an embodiment of the invention, use probability theory to model the power consumption of the interface 16 versus the sleep-state transition timing for the data-transfer sequence 90. For each predetermined $\lambda_\mu/\lambda_t$ and $\lambda_p/\lambda_t$ pair, one first tests an interface 16 and records the data-burst inter-arrival times $\Delta t_j$ for a variety of operator activities, such as email and streaming video data. Based on the recorded inter-arrival times $\Delta t_j$, one develops a probability model for each predetermined $\lambda_\mu/\lambda_t$ and $\lambda_p/\lambda_t$ pair. This model includes the respective probability that transitioning to the sleep state 106 after a particular elapsed time in the idle state 104 will yield a power savings. As a general rule, the longer the time in the idle state 104, the greater the probability that the time until the arrival of the next data burst will be long enough so that transitioning to the sleep state 106 will consume less power than remaining in the idle state. For example, the probability of saving power by transitioning to the sleep state 106 may be 10% after 100 milliseconds in the idle state 104, but this probability may increase to 90% after 300 milliseconds in the idle state.

Using this model, one determines for each $\lambda_\mu/\lambda_t$ and $\lambda_p/\lambda_t$ pair the sleep-state transition protocol that causes the interface 16 to consume the least power in a probabilistic sense while operating according to the data-sequence 100, and stores this protocol in the LUT 46 (FIG. 2) as part of the data-transfer sequence. For example, following such a protocol, the resource manager 44 may cause the interface 16 to enter the sleep state 96 after a time T having a probability of power savings that is 50%. More specifically, suppose that after 200 milliseconds in the idle state 104, the probability is greater than 50% that the time $\Delta t_j$ until the arrival of the next data burst will be greater than the break-even time $T_{be}$ of equation (9). That is, after 200 milliseconds, the probability is greater than 50% that causing the interface 16 to enter the sleep state 106 will save power. Therefore, the protocol may dictate that the resource manager 44 cause the interface 16 to enter the sleep state 106 whenever the time elapsed since the arrival of the most recent data burst exceeds 200 milliseconds.

One can determine the sleep-state-transition protocol using known probability techniques. Such known techniques include the Renewal Theory Model, the Semi-Markov Average Cost Model, and the Time-Indexed Semi-Markov Average Cost Model, which are described in "Event-Driven Power Management," T. Simunic, L. Benini, P. Glynn, G. De Micheli, IEEE Transactions on CAD, pp. 840-857, July 2001, which is incorporated by reference.

Figure 7A:
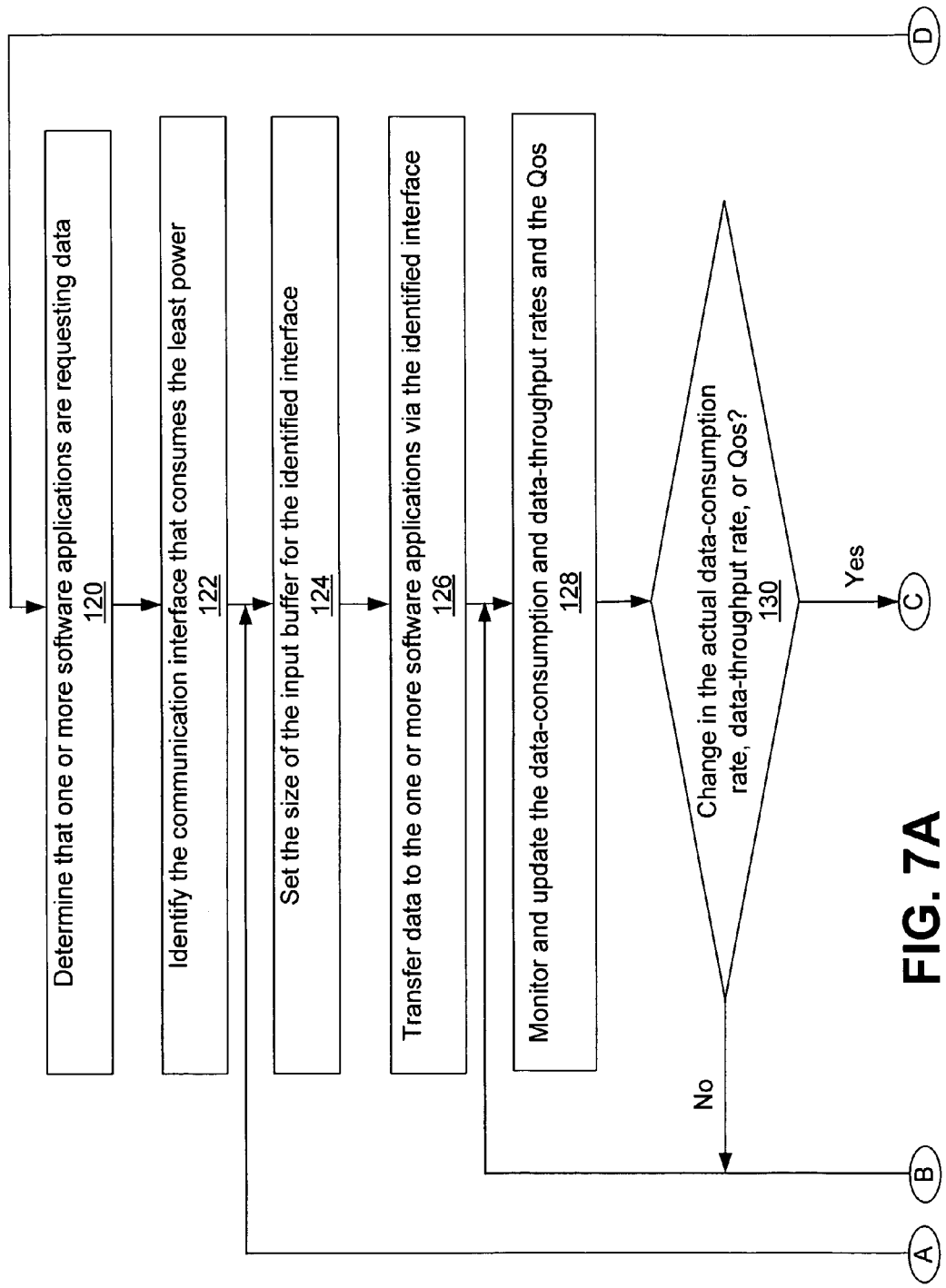
FIGS. 7A and 7B are a flowchart showing the operation of the electronic device of FIG. 1 according to another embodiment of the invention.
Figure 7B:
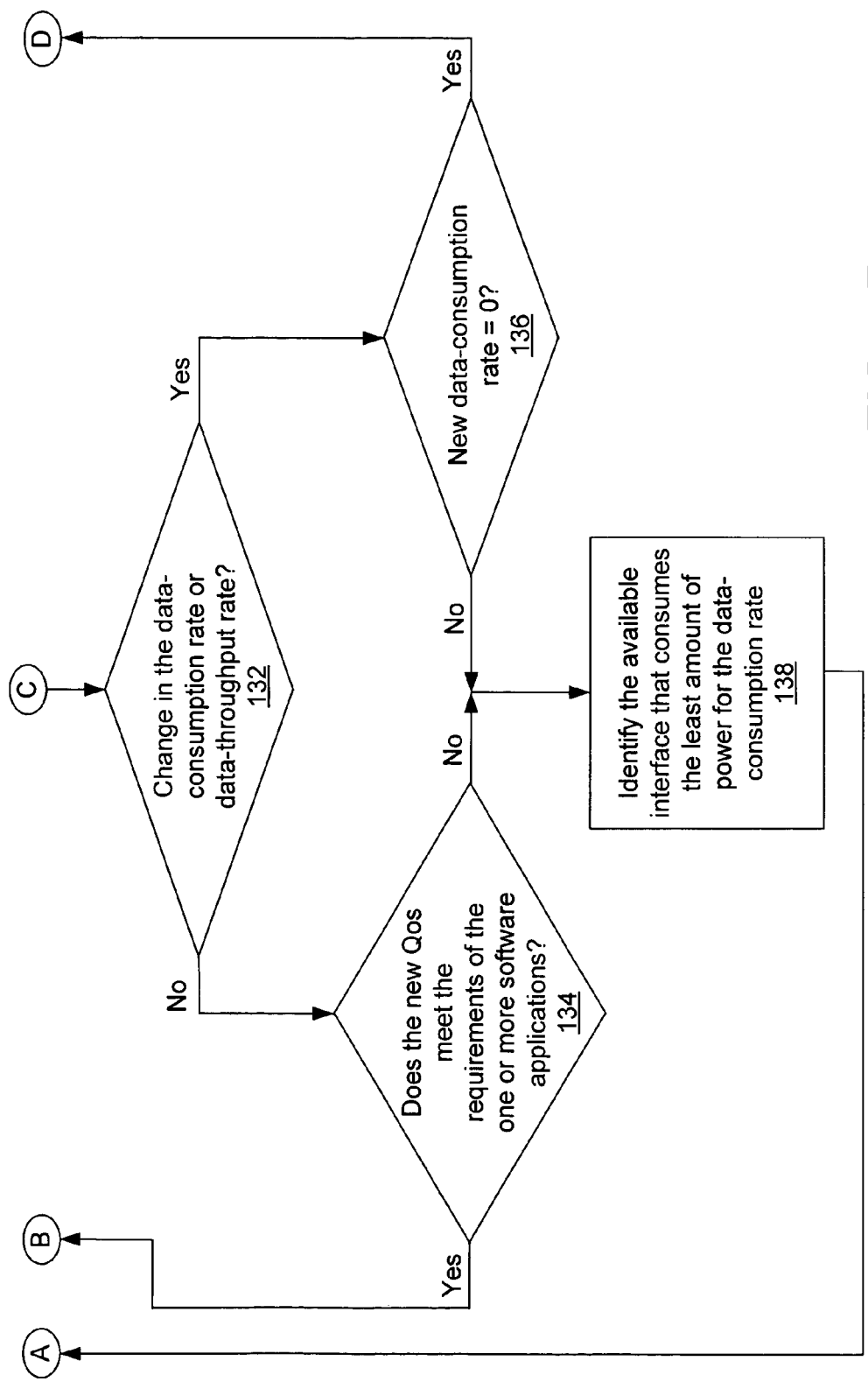

FIGS. 7A and 7B are respective portions of a flowchart that details the operation of the device 42 (FIG. 2) according to another embodiment of the invention, where one or more software applications 30 consume data from the network 14 via the interface 16 that consumes the least power of all the available interfaces and the corresponding base station 12. Compared to the operational embodiment of the device 42 described in the flow chart of FIGS. 2A and 2B, the operational embodiment described in FIGS. 7A and 7B includes fewer steps, and thus allows one to simplify the resource manager 44, and may also allow one to omit quality-of-service information from the LUT 46. Unless otherwise indicated, the operation of the device 42 is similar where the one or more software applications 30 are producing data and sending the data to the network 14, and where the resource manager 44 selects the available interface 16 having the best performance of a parameter other than power consumption.

Referring to FIGS. 1 and 7A, in step 120, which is similar to step 50 of FIG. 2A, the resource manager 44 determines that one or more software applications 30 are requesting data from the network 14 of FIG. 1.

Next, in step 122, the resource manager 44 accesses the LUT 46 and identifies the interface 16 that consumes the least power regardless of data-consumption rate $\lambda_\mu$ and data-throughput rate $\lambda_t$. That is, the resource manager 44 ignores $\lambda_\mu$ and $\lambda_t$ and identifies the interface 16 that consumes the least power in an absolute sense.

Then, in step 124, which is similar to step 74 of FIG. 2A, the resource manager 44 sets the size of the input buffer 18 for the identified interface 16. For equations (3)-(8), the resource manager 44 uses the values of $\lambda_\mu$ and $\lambda_t$ associated with the identified interface 16 in the LUT 46. For example, referring to FIG. 3, if the identify of the least-power-consuming interface 16 is stored in the location $62_{xy}$, then the resource manager 44 uses $\lambda_{\mu x}$ and $\lambda_{ty}$ as $\lambda_\mu$ and $\lambda_t$ in equations (3)-(8).

Next, in step 126, which is similar to step 78 of FIG. 2B, the resource manager 44 causes the identified interface 16 to begin receiving data from the network 14 and the corresponding base station 12, and filling the input buffer 18 with this received data. The resource manager 44 also causes the CPU 24 to begin processing the data in the input buffer 18 under the control of the one or more software applications 30. That is, the resource manager 44 causes the one or more software applications 30 to begin consuming the data in the input buffer 18.

Then, in step 128, which is similar to step 80 of FIG. 2B, the resource manager 44 monitors and updates the data-consumption rate $\lambda_\mu$ of the one or more software applications 30, the data-throughput rate $\lambda_t$ of the active interface 16, and the quality of service provided by the interface relative to one or more parameters (e.g., BER) specified by the one or more software applications.

Next, in step 130, which is similar to step 82 of FIG. 2B, the resource manager determines whether $\lambda_\mu$, $\lambda_t$, or the quality of service has changed. If none of these quantities has changed, then the resource manager 44 repeats step 128. But if any of these quantities has changed, then the resource manager 44 proceeds to step 132 of FIG. 7B.

In step 132, which is similar to step 84 of FIG. 2B, the resource manager 44 determines whether $\lambda_\mu$ or $\lambda_t$ has changed. If not, then only the quality of service has changed, and the resource manager 44 proceeds to step 134. But if $\lambda_\mu$ or $\lambda_t$ has changed, then the resource manager proceeds to step 136.

In step 134, which is similar to step 86 of FIG. 2B, the resource manager 44 determines whether the new quality of service meets the requirements of the one or more software applications 30. If so, then the resource manager 44 returns to step 128 of FIG. 7A. If not, then the resource manager 44 proceeds to step 138.

In step 136, which is similar to step 88 of FIG. 2B, the resource manager determines whether the data-consumption rate is 0, i.e., whether the one or more software applications 30 have stopped consuming data. If so, then the resource manager 44 returns to step 120. If not, then the resource manager 44 proceeds to step 138.

In step 138, the resource manager 44 identifies the available interface 16 that consumes the least amount of power for the current data-consumption rate $\lambda_\mu$, which the resource manager updated in step 128, and returns to step 124 of FIG. 2A. For example, suppose the currently active interface 16 has an insufficient data-throughput rate $\lambda_t$ for the current data-consumption rate $\lambda_\mu$, or provides a quality of service that does not satisfy the requirements of the one or more software applications 30. Consequently, the resource manager 44 labels this interface 16 as "unavailable," and identifies from the LUT 46 the least-power-consuming available interface 16 capable of a data-throughput rate $\lambda_t$ that is greater than or equal to the data-consumption rate $\lambda_\mu$.

After performing step 138, the resource manager 44 returns to step 124 and sets the size of the input buffer 18 corresponding to the newly identified interface 16.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. For example, although described for use with wireless interfaces in a battery-operated device, the above-described techniques may be applied to any type of data-transfer device such as a hard-disk-drive controller. Thus, the present invention is not intended to be limited to the embodiments shown, but is to be accorded the widest scope consistent with the principles and features disclosed herein.

What is claimed is:

1. An electronic apparatus, comprising:
   communication interfaces; and
   a processor coupled to the interfaces and operable to,
      execute a software application and process data at a processing rate while executing the software application,
      transfer data via a first one of the interfaces while executing the software application,
      monitor a data rate associated with the data transfer,
      calculate a probability value related to a probability that the data rate has changed,
      compare the calculated probability value to a predetermined threshold,
      in response to the calculated probability exceeding the threshold, identify a second interface that is operable to transfer the data at a respective throughput rate that is greater than or equal to the processing rate and with a performance of a parameter that is closer to a desired performance level than the performance of the same parameter by another of the interfaces having a throughput rate that is greater than or equal to the processing rate, and
      switch the transferring of data from via the first interface to via the second interface.

2. The electronic apparatus of claim 1 wherein the parameter comprises power consumption and the second interface is operable to consume less power than another interface having a throughput rate that is greater than or equal to the processing rate.

3. The electronic apparatus of claim 1 wherein the data rate comprises the processing rate of the processor.

4. The electronic apparatus of claim 1 wherein the data rate comprises the throughput rate of the first interface.

5. The electronic apparatus of claim 1 wherein the processor is operable to identify the second interface by accessing a look-up table.

6. The electronic apparatus of claim 1 wherein:
   the processor is operable to transfer the data by causing the interface to operate according to a first data-transfer sequence;
   identifying the second interface comprises identifying a second data-transfer sequence; and
   switching the data transfer to via the second interface comprises switching the data transfer to via the first interface operating according to the second data-transfer sequence.

7. The electronic apparatus of claim 1 wherein the processor is operable to identify the second interface in response to the calculated probability equaling or exceeding the threshold.

8. The electronic apparatus of claim 1 wherein the threshold is less than one.

9. The electronic apparatus of claim 1 wherein the probability value comprises the natural logarithm of the probability.

10. A method, comprising:
    transferring data via a first communication interface while processing data at a processing rate;
    monitoring a data rate associated with the transferring of data;
    calculating a probability value that is related to a probability that the data rate has changed;
    determining that the data rate has changed if the calculated probability value exceeds a predetermined threshold that is less than one;
    in response to a change in the data rate, identifying a second communication interface that is operable to transfer the data at a respective throughput rate that is greater than or equal to the processing rate and that performs an operating parameter closer to a desired performance level than another communication interface having a throughput rate greater than or equal to the processing rate performs the parameter; and
    transferring data via the second interface.

11. The method of claim 10, further comprising ceasing the transferring of data via the first interface in response to the change in the data rate.

12. The method of claim 10 wherein:
    the first interface comprises an interface operating according to a first data-transfer sequence; and
    the second interface comprises the same interface operating according to a second data-transfer sequence.

13. An article of manufacture, comprising:
    a computer-readable medium having stored thereon instructions operable to cause a processor to,
       transfer data via a first communication interface while processing data at a processing rate,
       monitor a data rate associated with the transfer of the data,
       calculate a probability that the data rate has changed,
       determine that the data rate has changed if the calculated probability exceeds a predetermined threshold that is less than one,
       in response to a change in the data rate, identify a second communication interface that is operable to transfer the data at a respective throughput rate that is greater than or egual to the processing rate and that performs an operating parameter closer to a desired performance level than another communication interface having a throughput rate greater than or equal to the processing rate performs the parameter, and
       transfer data via the second communication interface.

14. The article of claim 13 wherein the medium comprises a magnetic storage medium.

15. The article of claim 13 wherein the medium comprises an optical storage medium.

* * * * *

UNITED STATES PATENT AND TRADEMARK OFFICE
CERTIFICATE OF CORRECTION

PATENT NO. : 7,246,181 B2
APPLICATION NO. : 10/941583
DATED : July 17, 2007
INVENTOR(S) : Tajana Simunic Rosing It is certified that error appears in the above-identified patent and that said Letters Patent is hereby corrected as shown below:

In column 18, line 55, in Claim 13, delete "egual" and insert -- equal --, therefor.

Signed and Sealed this

Seventeenth Day of November, 2009

David J. Kappos
*Director of the United States Patent and Trademark Office*